No. 772,629. Patented October 18, 1904.

UNITED STATES PATENT OFFICE.

TRUMAN GARRET PALMER, OF CHICAGO, ILLINOIS.

BURLAP BAG.

SPECIFICATION forming part of Letters Patent No. 772,629, dated October 18, 1904.

Application filed May 4, 1904. Serial No. 206,414. (No specimens.)

*To all whom it may concern:*

Be it known that I, TRUMAN GARRET PALMER, a citizen of the United States, residing in the city of Chicago, county of Cook, State of Illinois, have invented certain new and useful Improvements in Burlap Bags; and I do hereby declare the following to be a full, clear, and exact description of the invention, such as will enable others skilled in the art to which it appertains to make and use the same.

For the shipment of sugar and other food products of considerable bulk and of a granular character it is quite common to employ an outer bag of burlap or similar coarse material of more or less open weave and an inner bag of cotton fabric, paper, or the like. The inner cotton fabric or paper bag has for its purpose to prevent the material from issuing through the meshes of the burlap or from partially embedding itself therein, so as to occasion a loss of material, and also to protect the material from the infiltration of dirt and other foreign substances through the burlap, and, furthermore, to protect the material from the characteristic odor of the burlap and to prevent the contamination of the material by the minute hair-like filaments or fuzz of the burlap strands, which otherwise in rubbing off from the fabric mix with the material and render it unsalable or materially diminish its commercial value.

The purpose of my present invention is to dispense entirely with the necessity for the employment of the inner bag referred to and to so treat the burlap bag itself that it shall be adapted for the shipment of sugar and other granular food products. This purpose I effect by the employment of relatively cheap materials and by a simple and inexpensive manipulation.

In carrying out my invention I mat and lay the minute hair-like fibers or fuzz referred to by sizing the surface of the burlap fabric with a solution of starch, flour, glucose, dextrine, gelatin, or some equivalent agglutinant soluble in water. For this purpose I prefer to select an agglutinant which, while freely soluble in hot or boiling water, is more difficultly soluble in cold water. For instance, I find that starch mixed with water and boiled therein until the mixture forms a freely-flowing paste capable of being applied to the fabric by means of a brush is particularly adapted to the purpose of the invention. For most purposes it will suffice to apply this paste to the inner surface of the burlap bag and in quantity only sufficient to lay or mat the fuzz and to form a thin film over the meshes of the fabric, which are usually sufficiently close together for that purpose. Care should be taken to restrict the quantity of agglutinant employed to that which suffices for laying or matting the fuzz, the closing of the pores or meshes being more or less incidental to the operation and unnecessary where the weave of the burlap is sufficiently close, whereas the employment of a thicker layer of agglutinant than is essential for the matting or laying of the fuzz is of disadvantage, for the reason that if the layer is too thick it has a tendency to flake off and mix with the material in the bag. Where just the necessary amount is employed for laying or matting the fuzz, the fuzz itself serves to anchor or bind the thin layer of agglutinant to the fabric and prevent any substantial portion of it being separated from the bag-surface. It is of course also to be observed that the composition of the agglutinant shall be such as is innocuous to food products and unobjectionable to the particular character of the food product for whose shipment the bag is intended. In many instances I prefer to coat both the interior and exterior surface of the bag with the agglutinant as an additional precaution against the infiltration into the interior of dust or dirt on the cars, on the car-platforms, or elsewhere during transportation or shipment. I find that the low solubility of the agglutinant in cold water is a factor sufficient to protect the contents of the bag treated from expectorations of tobacco-juice or from sudden dashes of rain or water of moderate amount, even though the treated bag is not waterproof in the strict sense of that term.

It will of course be understood that in lieu of applying the agglutinant to the finished bag by a brush or the like it may be of advantage to apply it to the fabric itself before the bags are made up—as, for instance, by passing the burlap through a tank or vat filled with the desired solution, then passing it between rollers to equalize its distribution and to expel the surplus, and then over heated rollers or other suitable means to dry it, so that it can be immediately rolled or folded up and subsequently be made up into bags.

The characteristic odor of burlap bags is in my opinion due principally to the fuzzy exterior. By matting and laying the filaments or fuzz by means of an agglutinant of the kind described I find that the bag substantially loses its former characteristic odor and that materials shipped in it are uncontaminated either by this odor or by the presence of the filaments or fuzz itself.

The solubility of the agglutinant in hot water permits the bag to be thoroughly washed after it has been used for the shipment of any particular material and to be then reused for the same or another material by again coating it with the agglutinant.

Having thus described my invention, what I claim is—

1. A burlap bag, having upon its surface an agglutinant in quantity only sufficient to mat or lay the fuzz, and to anchor or secure the same more firmly to the fabric.

2. A burlap bag, coated with an agglutinant that is soluble in water, said coating being only sufficient to mat or lay the fuzz upon the surface of the fabric but not sufficient to destroy the porosity of the bag or to render it waterproof.

3. A burlap bag, the material of which has been treated with a soluble agglutinant to mat or lay down and stiffen the fibers or fuzz on the surface of the fabric without rendering the bag waterproof or destroying its porosity.

4. A burlap bag, having the fuzz or fibers on the surface of the fabric matted down and stiffened by an agglutinant that is soluble in cold water so as to permit the bag to be washed and re-treated.

5. A washable burlap bag, having the natural fuzz or fibers on the surface of the fabric matted down and stiffened by a thin temporary application of an agglutinant that will dissolve when the bag is washed.

6. A bag of coarse woven material, having a wash or thin coating of an agglutinant that is soluble in water, whereby the interstices are only partially closed and the fuzz and fibers of the fabric are stuck down on the surface and prevented from rubbing off and mixing with the bag's contents.

In testimony whereof I affix my signature in presence of two witnesses.

TRUMAN GARRET PALMER.

Witnesses:
JOHN C. PENNIE,
W. BEALLE WILLIAMS.